United States Patent [19]

Savage et al.

[11] 3,757,417

[45] Sept. 11, 1973

[54] CUTTER

[75] Inventors: Donald Stanley Savage, St. Albans; Paul Edward Prosser, London, both of England

[73] Assignee: Aerpat A.G., Zug, Switzerland

[22] Filed: June 28, 1971

[21] Appl. No.: 157,506

[30] Foreign Application Priority Data

July 2, 1970 Great Britain.................32172/70

[52] U.S. Cl. .................................... 30/179, 30/124
[51] Int. Cl. ........................................... B26b 17/04
[58] Field of Search..................... 30/124, 131, 134, 30/135, 179, 186, 187, 191, 192, 193, 233

[56] References Cited
UNITED STATES PATENTS

| | | | |
|---|---|---|---|
| 1,444,044 | 2/1923 | Tener.................................... | 30/134 |
| 683,457 | 10/1901 | Flowers................................. | 30/131 |
| 1,653,340 | 12/1927 | Carolus................................. | 30/179 |

FOREIGN PATENTS OR APPLICATIONS

| | | | |
|---|---|---|---|
| 111,821 | 8/1964 | Czechoslovakia..................... | 30/124 |
| 1,033,749 | 7/1958 | Germany.............................. | 30/187 |

Primary Examiner—James L. Jones, Jr.
Attorney—Kemon, Palmer & Estabrook

[57] ABSTRACT

A cutter suitable for cutting, for example, swaged-on metal collars of lockbolts to facilitate removal of the lockbolts has two blades movable to bring their cutting edges together to cut a collar beteen them, and has resilient guides attached to the blades for guiding the blades to cut a collar or other workpiece symmetrically.

1 Claim, 9 Drawing Figures

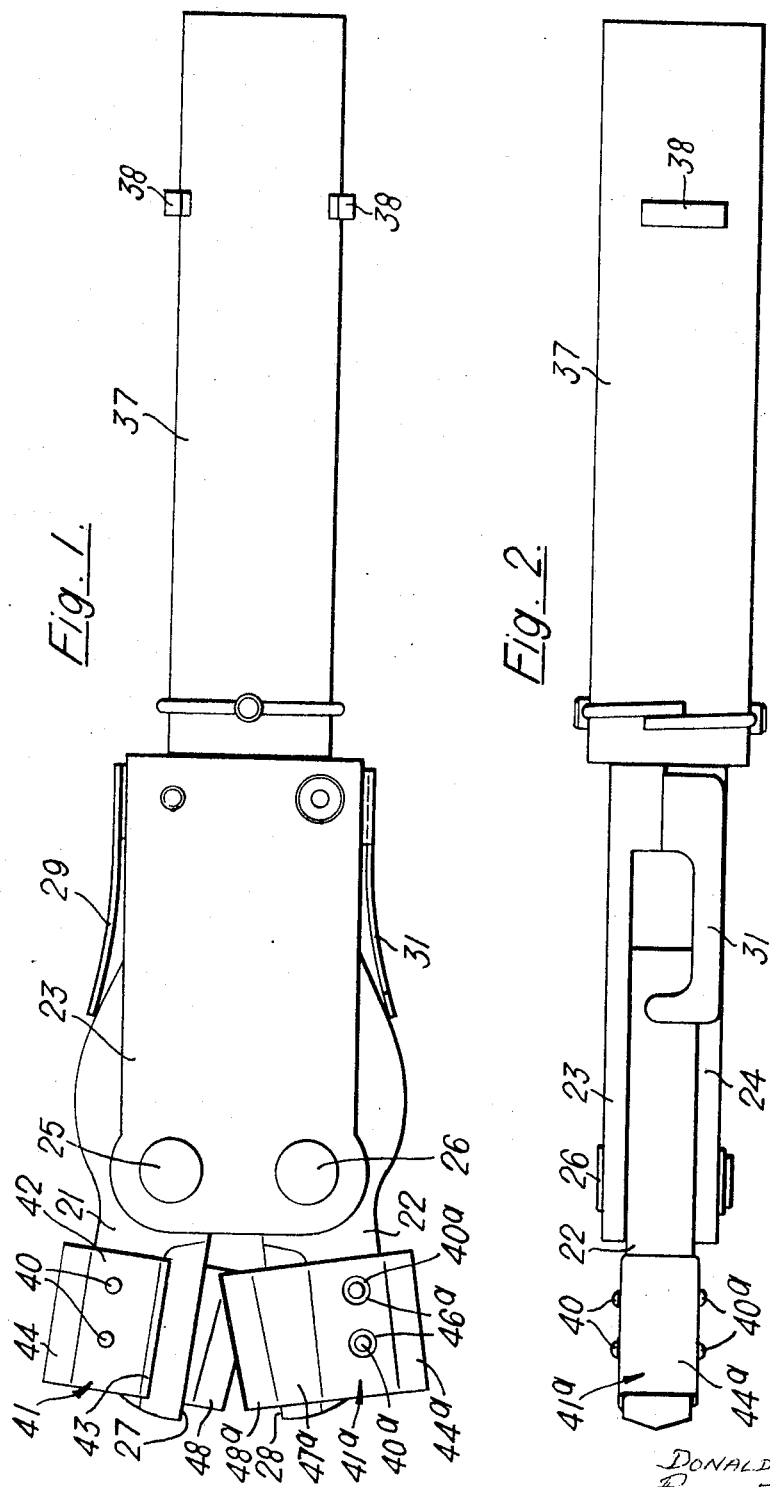

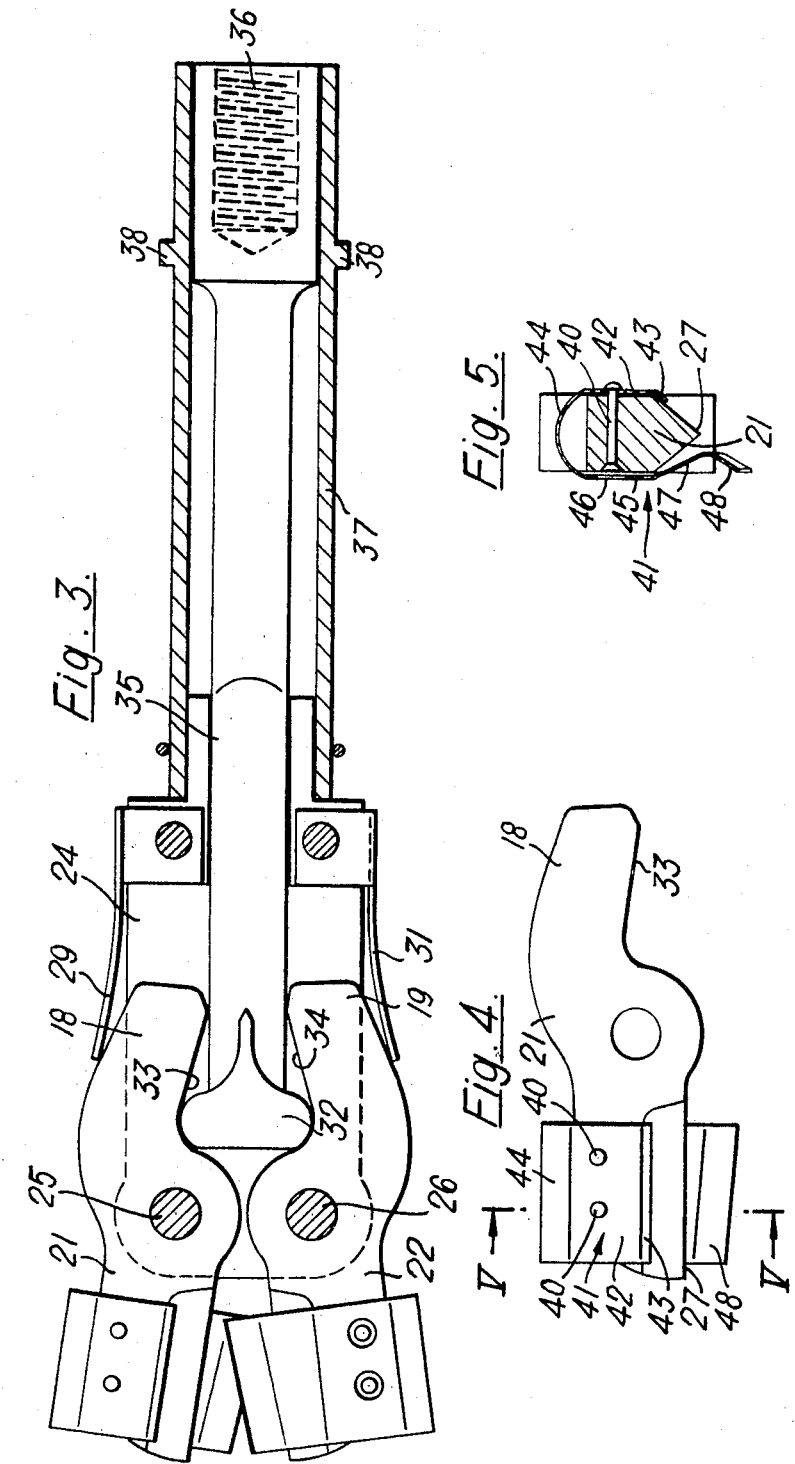

CUTTER

This invention relates to a cutter and more particularly to a cutter which facilitates the cutting of a workpiece at a desired position.

A particular operation which, it is thought, the invention may facilitate is the removal from an assembly of a fastener of the kind known as a lockbolt which is secured in position by an annular collar swaged on to the stem of the lockbolt. The cutter may be used to cut the collar substantially diametrically into two parts so that the parts fall away from the stem, leaving the stem free to be withdrawn from the assembly.

The collar of a lockbolt is usually of substantially cylindrical shape and is circular in cross section: and the stem of the lockbolt extends axially through the bore of the collar. The most expedient way of removing the collar is to cut it longitudinally from diametrically opposite positions on its periphery. This, however, is difficult to achieve with conventional tools: for example, conventional bolt-croppers are difficult to position so as to cut the collar diametrically and have a tendency to slip away from this position.

According to the present invention, there is provided a cutter comprising two opposed blades relatively movable towards each other to cut a workpiece between them, and a guide associated with each blade, the two guides being disposed on mutually opposite sides of the pair of blades and being arranged so that, when the blades are moved towards each other as aforesaid, the guides engage respectively with mutually opposed positions on the workpiece between the blades, thereby to assist in positioning the cutter blades in the appropriate positions with respect to the workpiece to facilitate cutting thereof.

When a symmetrical workpiece is to be cut symmetrically the shape and disposition of at least those parts of the guides which engage the workpiece are symmetrically arranged with respect to the cutting plane of the cutter. The aforesaid part of each guide member may be inclined to the direction in which the cutter blades are relatively movable towards each other, and may also be inclined to a direction parallel to the aforesaid axis of symmetry when the cutter is in use.

The guides may be resilient or resiliently mounted, and each may be mounted on its associated blade for movement therewith. In a preferred embodiment of the invention, the guides are themselves resilient and are made of spring steel strip. Also in a preferred embodiment of the invention, each guide is secured to one side of its associated blade and has a workpiece engaging part which is disposed on the other side of the associated blade, the guide extending around the back (i.e., the part remote from the other blade) of the associated blade.

A specific embodiment of the invention will now be described by way of example and with reference to the accompanying drawings, in which:

FIG. 1 is an elevation of a cutter;

FIG. 2 is another elevation of the cutter, taken at right-angles to that of FIG. 1;

FIG. 3 is a partly sectional elevation, otherwise similar to FIG. 1;

FIG. 4 is an elevation of one of the cutter blades and its associated guide member;

FIG. 5 is a section on the line V—V of FIG. 4;

Figure 6:
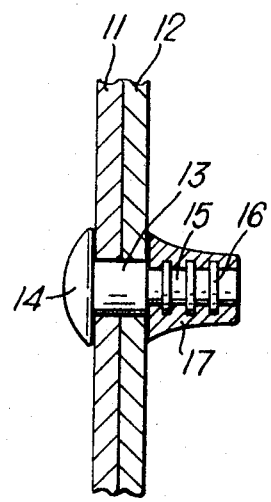
FIG. 6 is a section through a particular form of workpiece which the cutter is adapted to cut.

The cutter of this example is designed and adapted to perform a cutting operation on a swaged collar of a lock-bolt. Referring first to FIG. 6, there is shown a well known form of lockbolt securing together two apertured metal sheets 11, 12. The lockbolt comprises a stem 13 which extends through aligned apertures of the two sheets, and a collar 17. The stem has an enlarged head 14 on one end and a swaging portion 15 comprising alternate circumferential grooves 15 and lands 16 at the other end. The collar 17 has been swaged into the grooves by means of a powerful hydraulically operated swaging tool so that the collar is secured to the stem. The stem is under considerable tension and the two sheets are clamped together between the head of the stem and the collar. Such lockbolts are sold in many countries of the world under the trademarks "Huckbolt" and "Avdelok."

Such a lockbolt, once placed, is normally considered to be a permanent fixture, but it is sometimes necessary to undo and remove the fastening. The cutter of the present example is adapted to facilitate cutting or splitting of the swaged collar of the lockbolt, and comprises two opposed blades 21, 22 both mounted between two rigidly interconnected opposed cheek plates 23, 24. The blades are pivotally mounted at approximately their middle positions on pivot pins 25, 26 respectively, and have tail portions 18, 19 which extend rearwardly of the pivot pins and between the cheek plates and cutting portions which extend forwardly of the pivot pins and beyond the cheek plates and which are bevelled to provide straight cutting edges 27, 28 respectively opposed to each other. The blades are urged to pivot towards the open position (i.e., with their cutting edges 27, 28 apart from each other) by means of two springs 29, 31 respectively, mounted between the ckeek plates, which urge the tail parts 18, 19 towards each other. The adjacent surfaces 33, 34 of the tail parts 18, 19 of the blades are inclined towards each other in the rearward direction away from the pivot pins. A cam 32 which lies between the surfaces 33, 34 and bears against them is secured to or integral with one end of a drawbar 35, which has at its other end an internal threaded connection socket 36. The blades can be moved towards the closed position (i.e., moving their cutting edges 27, 28 towards each other) by rearward movement of the cam 32. The drawbar 35 extends rearwardly through a tube 37 which is secured at its forward end to the cheek plates 23, 24. The tube is provided with coupling lugs 38 near its other end. The tube 37 and drawbar 35 are adapted to be connected, by means of the lugs 38 and threaded socket 36 respectively, to the head of the hydraulic pulling tool of the type which is normally used for the swaging of lockbolts which the cutter is intended to be used on. When the cutter is connected to the hydraulic pulling tool and the tool is operated, the drawbar 35 is pulled with considerable force through a suitable stroke rearwardly with respect to the tube 37. As the cam 32 moves rearwardly along the inclined surfaces 33, 34 of blade tails 18, 19, the tail portions of the blades are forced apart causing the blades to pivot, thus causing their cutting edges 27, 28 to move towards each other with a force sufficient to cut through the swaged collar 17 of the lockbolt.

Figure 7:
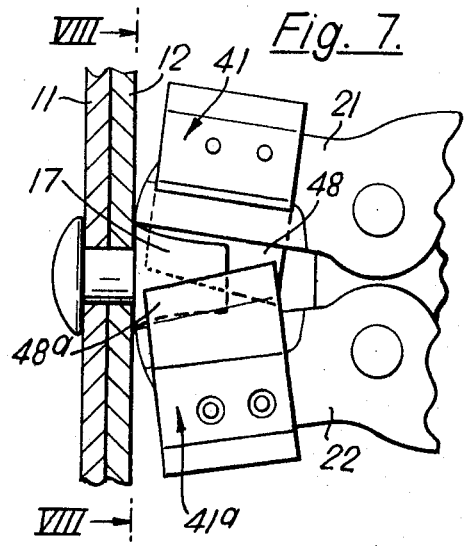
FIG. 7 is similar to FIG. 6 but shows the cutter (similarly to FIG. 3) applied to the workpiece before cutting commences.
Figure 8:
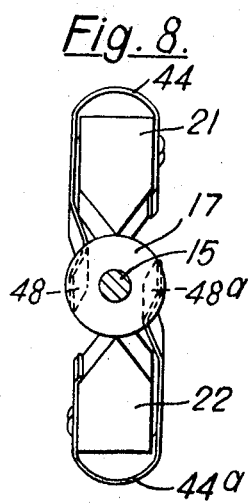
FIG. 8 is a section on the line VIII—VIII of FIG. 7.

It will be apparent from FIGS. 6, 7, and 8 that the shape of the exterior surface of the swaged collar 17 is of generally symmetrical about the axis of the lockbolt pin, and that it tapers towards its free end, and is slightly of concave or saddleback curvature in the longitudinal direction.

The cutter of this example has secured to its blades guides 41, 41a which assist in positioning and retaining the cutter blades in diametrically opposed positions on the periphery of the collar 17, whilst the blades cut the collar.

The two blades 21, 22 are identical, and each blade and its associated guide together is identical with the other blade and its associated guide. (Since the two guides are identical, the parts of the guide 41a associated with the cutter blade 22 are designated in the drawings by similar reference numerals to those of the guide 41 associated with cutter blade 21 but with the addition of the suffix a.) The blade 21 and its associated guide 41 are illustrated in FIG. 4 and 5. The guide 41 is made of spring steel strip and, as illustrated in FIG. 5, is generally of U-shaped section, having a short arm 42 and a long arm 45 joined by an arcuate web 44. Each guide extends along the cutting portion of its associated blade over a zone which is rather shorter than the length of the cutting edge and which stops short of each end of the cutting edge. The arm 42 of the guide is secured in contact with one side face of the blade 21 by means of two rivets 40 passing through the blade and the arm. The free end part 43 of the arm 42 is bent inwardly of the U so as to lie in contact with the cutting bevel of the blade. The arcuate web 44 of the guide extends around the back of the blade (i.e., the part remote from its cutting edge 27) and is spaced away therefrom. The long arm 45 of the U-shaped guide 41 has a flat portion adjacent to the web 44 which portion extends parallel to the other side face of the blade 21 but slightly spaced away therefrom. The arm 45 is provided with two circular holes 46 (in FIG. 3 the two corresponding holes 46a on the other guide 41a are indicated) which allow the rivets 40 to be set when securing the guide to the blade. The long arm 45 extends beyond the cutting edge of the blade with a connecting portion 47 which is inclined inwardly of the U and ends in a flat, outwardly inclined, workpiece-engaging portion 48.

It will be seen from FIGS. 5 and 8 that the workpiece engaging portions 48, 48a of the two guides are inclined to a line extending between the cutting edges of the two blades and are also inclined to a line parallel to the two cutting edges 27, 28. The arrangement is such that, in use of the cutter, each of the workpiece engaging portions 48, 48a is substantially tangential to the part of the surface of the lockbolt collar which it engages.

Figure 9:
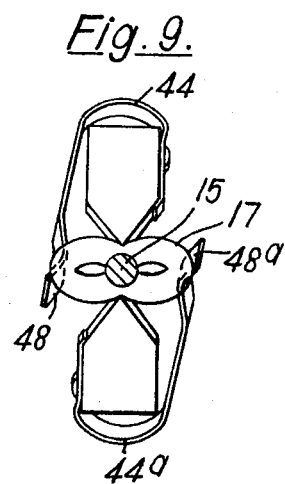
FIG. 9 is similar to FIG. 8 but shows the position when the cutting is nearly completed.

The manner of use of the cutter is illustrated in the FIGS. 7, 8 and 9. With the cutter blades in the open position (as illustrated in FIGS. 1 and 3), the cutter is offered up to the collar 17 so that the collar enters between the cutting edges 27, 28 and also between the two workpiece-engaging portions 48, 48a of the guides.

The portions 48, 48a of the two guides engage the collar at diametrically opposed positions on the collar. Since the collar is symmetrical, and the two guides are identical and therefore have substantially the same deflection rate, the two guides guide the cutter so that the collar becomes centered between the cutting edges 27, 28. The cutter is pushed fully onto the collar so that the two cutting edges 27, 28 extend along the entire length of the collar, as illustrated in FIG. 7. In this example, since the shape and the dimensions of the blades and guides is designed to suit the particular dimensions of the lockbolt collar on which they are being used, the two guides are in contact with the lockbolt collar but are substantially undeflected in this position. Since the guides do not extend quite as far forwardly as the forward ends of the blades, the guides do not engage the sheet 12 and so do not mark or scratch it.

The hydraulic tool to which the cutter is connected is now operated, thus progressively closing the cutting edges of the blades together with considerable force. It is found in practice that this initially causes the swaged collar to collapse between the cutting edges of the blades and to expand in the direction at right angles as shown somewhat schematically in FIG. 9, thus forcing the guides apart. It will be seen that, since the arrangement is symmetrical, the arms 45, of the two guides are both deflected by a similar amount and it is found that the majority of the deflection is accommodated in the region of the arcuate web 44 of each guide and in particular at the junction between the web 44 and the adjacent flat portion of the arm 42 which is secured to the blade. The deflection of the guides will apply to each blade of the cutter a twisting force or torque about its longitudinal axis, but the construction of the cheek plates and pivot pins of the cutter is sufficiently strong to resist this torque and prevent any substantial misalignment of the cutting edges of the blades.

As the cutting edges of the blades are urged closer together, they eventually penetrate through the thickness of the collar which is thereby cut into two halves which separate and release the stem of the lockbolt. Due to the force with which the cutter blades penetrate the collar, the two halves of the collar tend to fly apart with some force when finally separated. The guides absorb the kinetic energy of the collar halves and protect the operator from the danger of being struck by flying parts of the split collar. In practice it is of course found that the swaging portion of the lockbolt stem is also damaged by the cutter blades, but this is of no importance since in any case the stem cannot be re-used with a new collar.

The cutter of the foregoing example is advantageous in that it provides a simple and accurate means of guiding the cutting edges to suitable cutting positions on the lockbolt collar and of maintaining them so positioned until the cutting process is complete. Without such guiding means, it is found to be very difficult to hold the cutter so that the cutting edges cut or bite into the collar at diametrically opposite positions with the result that the blades tend to slide off the collar. In particular, providing a guide associated with each cutting blade, so that the two guides are on respectively opposite sides of the pair of blades, allows each guide to be extended around the back of the blade thus providing a considerable length of spring material in which the deflection of the workpiece engaging portions of the guide arms can be taken up during the cutting process. This reduces stress in the guide and increases the life of the guide.

The invention is not restricted to the details of the foregoing examples. For instance, the cutter could be of the type of which the two blades are not pivoted but move towards each other without pivotal movement. In particular, the cutting edges could be parallel to each other in both the open and closed positions of the blades. The cutter can also be used for cutting other things than swaged collars of lockbolts. The precise configuration and construction of the guides need not be exactly as shown in the accompanying drawings. They could be designed to engage and co-operate with workpieces which are of different shapes. The guide members need not be resilient in themselves but could instead be rigid members each resiliently mounted upon the cutter blade. Other arrangements than a powered pulling tool for producing the required cutting movement of the blades can be employed. The cutter could be operated manually, by being attached to a suitable manual tool instead of by a power tool.

We claim:

1. A cutter comprising two opposed blades and two guides, the blades being relatively movable towards each other to cut a workpiece between them, each guide being of U-shape and formed of spring steel, each guide comprising two arms joined by a web, one of said arms constituting workpiece-engaging means and the other of said arms constituting blade-engaging means, each blade having one of the guides associated therewith, wherein the blade-engaging means of each guide is disposed in contact with one side of its associated blade and the web of the guide extends freely round the back of the associated blade and the workpiece-engaging means is disposed on the other side of the associated blade and extends forwardly of the cutting edge thereof, the workpiece-engaging means of the two guides being disposed on mutually opposite sides of the two blades, only the blade-engaging means of each guide being secured to its associated blade so that the workpiece-engaging means of each guide is freely movable resiliently away from the workpiece-engaging means of the other guide.

* * * * *